United States Patent
Ozem et al.

(10) Patent No.: US 10,563,587 B2
(45) Date of Patent: Feb. 18, 2020

(54) FUEL NOZZLE WITH INCREASED SPRAY ANGLE RANGE

(71) Applicant: Pratt & Whitney Canada Corp., Longueuil (CA)

(72) Inventors: Hayley Ozem, Mississauga (CA); Oleg Morenko, Oakville (CA); Jean-Francois Grenier, Varennes (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 141 days.

(21) Appl. No.: 15/098,766

(22) Filed: Apr. 14, 2016

(65) Prior Publication Data

US 2017/0298829 A1  Oct. 19, 2017

(51) Int. Cl.
*F02C 7/22* (2006.01)
*F23R 3/28* (2006.01)
*F23D 11/10* (2006.01)
*F23D 11/24* (2006.01)
*F23D 11/38* (2006.01)
*F02M 61/18* (2006.01)

(52) U.S. Cl.
CPC .............. *F02C 7/222* (2013.01); *F02C 7/22* (2013.01); *F23D 11/107* (2013.01); *F23D 11/24* (2013.01); *F23D 11/383* (2013.01); *F23R 3/28* (2013.01); *F02M 61/1833* (2013.01); *F02M 61/1846* (2013.01); *F05D 2220/32* (2013.01); *F05D 2250/232* (2013.01); *F05D 2250/241* (2013.01); *F23D 2900/11101* (2013.01)

(58) Field of Classification Search
CPC .......... F02C 7/232; F02C 9/263; F02C 9/266;
F02C 7/22; F02C 7/222; F02M
61/1806–1846; F02M 61/1873; B05B
1/06; F23D 11/107; F23D 11/24; F23D
11/383; F23D 2900/11101; F23R 3/28;
F23R 3/286; F23R 3/12; F23R 3/14;
F05D 2220/32; F05D 2250/232; F05D
2250/241; F23C 7/004
USPC ..... 239/533.2–533.12, 584–585.5, 589, 595,
239/DIG. 7, 601; 60/737, 748, 740, 742
See application file for complete search history.

(56) References Cited

U.S. PATENT DOCUMENTS

| | | | | |
|---|---|---|---|---|
| 3,737,105 | A | * | 6/1973 | Arnold ...................... B05B 1/06 239/423 |
| 3,945,574 | A | * | 3/1976 | Polnauer ................... B05B 7/10 239/404 |
| 4,566,634 | A | * | 1/1986 | Wiegand ................ F02M 57/00 123/585 |

(Continued)

OTHER PUBLICATIONS

The Editors of Encyclopaedia Britannica, "Fluidics", Jul. 30, 2015, Encyclopaedia Brittanica, <https://www.britannica.com/technology/fluidics>.*

*Primary Examiner* — Cody J Lieuwen

(74) *Attorney, Agent, or Firm* — Norton Rose Fulbright Canada L.L.P.

(57) ABSTRACT

A gas turbine engine fuel nozzle comprises a spray tip defining a fuel exit passage therethrough that extends along a central axis. The fuel exit passage has an exit orifice aligned with the central axis. The exit orifice is circumscribed by an inner annular surface. The inner annular surface has a spherically-convex profile in cross-section, the profile being constant around the circumference of the inner annular surface.

8 Claims, 3 Drawing Sheets

(56) References Cited

U.S. PATENT DOCUMENTS

| | | | |
|---|---|---|---|
| 6,826,833 B1 * | 12/2004 | Maier | B23P 15/16 |
| | | | 239/463 |
| 6,918,549 B2 | 7/2005 | Theodorof | |
| 7,451,942 B2 * | 11/2008 | Borissov | F02M 21/0269 |
| | | | 123/527 |
| 8,033,113 B2 | 10/2011 | Patel et al. | |
| 8,827,187 B2 * | 9/2014 | Kobayashi | F02M 57/04 |
| | | | 239/399 |
| 2008/0053096 A1 * | 3/2008 | Morenko | F02C 7/22 |
| | | | 60/734 |
| 2013/0001331 A1 * | 1/2013 | Palle | A62C 31/00 |
| | | | 239/589 |

* cited by examiner

FUEL NOZZLE WITH INCREASED SPRAY ANGLE RANGE

TECHNICAL FIELD

The application relates generally to gas turbine engines and, more particularly, to fuel nozzles

BACKGROUND OF THE ART

Fuel nozzles, such as pressure atomizing fuel nozzles, are designed to achieve a specific fuel spray angle, which is based on combustion aero requirements. A typical spray angle range is typically obtained by introducing a conical shape fuel exit, which in combination with an adequate pressure can produce the desired spray angle range. But, in some cases, a wider spray range might be required.

SUMMARY

In one aspect, there is provided a gas turbine engine fuel nozzle comprising a spray tip defining a fuel exit passage extending about a spray axis, the fuel exit passage having a spherical distal end portion circumscribed by an annular lip curving away from the spray axis in a direction downstream from an incoming flow of fuel, the annular lip having a same curvilinear profile around a full circumference of the spherical end portion.

According to another aspect, there is provided a gas turbine engine fuel nozzle comprising: a spray tip defining a fuel exit passage therethrough that extends along a central axis, the fuel exit passage having an exit orifice aligned with the central axis, the exit orifice being circumscribed by an inner annular surface, the inner annular surface expanding in diameter in a downstream direction relative to a fuel flow direction through the fuel nozzle, the inner annular surface having a spherically-convex profile in cross-section, the profile being constant around the circumference of the inner annular surface.

In another aspect, there is provided a spray tip of a gas turbine engine fuel nozzle, the spray tip comprising: a body having a central fuel exit passage defining a spray axis, the fuel exit passage having a cylindrical portion and a spherical distal end portion extending coaxially from the cylindrical portion, the spherical distal end portion being circumscribed by an annular lip curving away from the spray axis in a downstream direction relative to an incoming swirling flow of fuel, the annular lip having a constant radius of curvature around a full circumference of the spherical distal end portion of the fuel exit passage.

In a further aspect, there is provided a method of increasing a spray angle of a gas turbine engine fuel nozzle comprising: exploiting the Coanda effect by causing a boundary layer of a jet of fuel discharged from a spray tip of the nozzle to attach to an annular outlet lip uniformly curving away from the spray axis around a full perimeter of a fuel exit passage of the spray tip.

In a still further general aspect, there is provided a method of increasing a spray angle of a gas turbine engine fuel nozzle comprising: providing a surface at an exit orifice of the fuel nozzle which is shaped such that a Coanda effect operates to cause a boundary layer of a jet of fuel discharged from a spray tip of the fuel nozzle to attach to the surface, the surface having a uniform spherically-convex cross-section around a circumference of the exit orifice.

DESCRIPTION OF THE DRAWINGS

Reference is now made to the accompanying figures in which.

DETAILED DESCRIPTION

Figure 1:
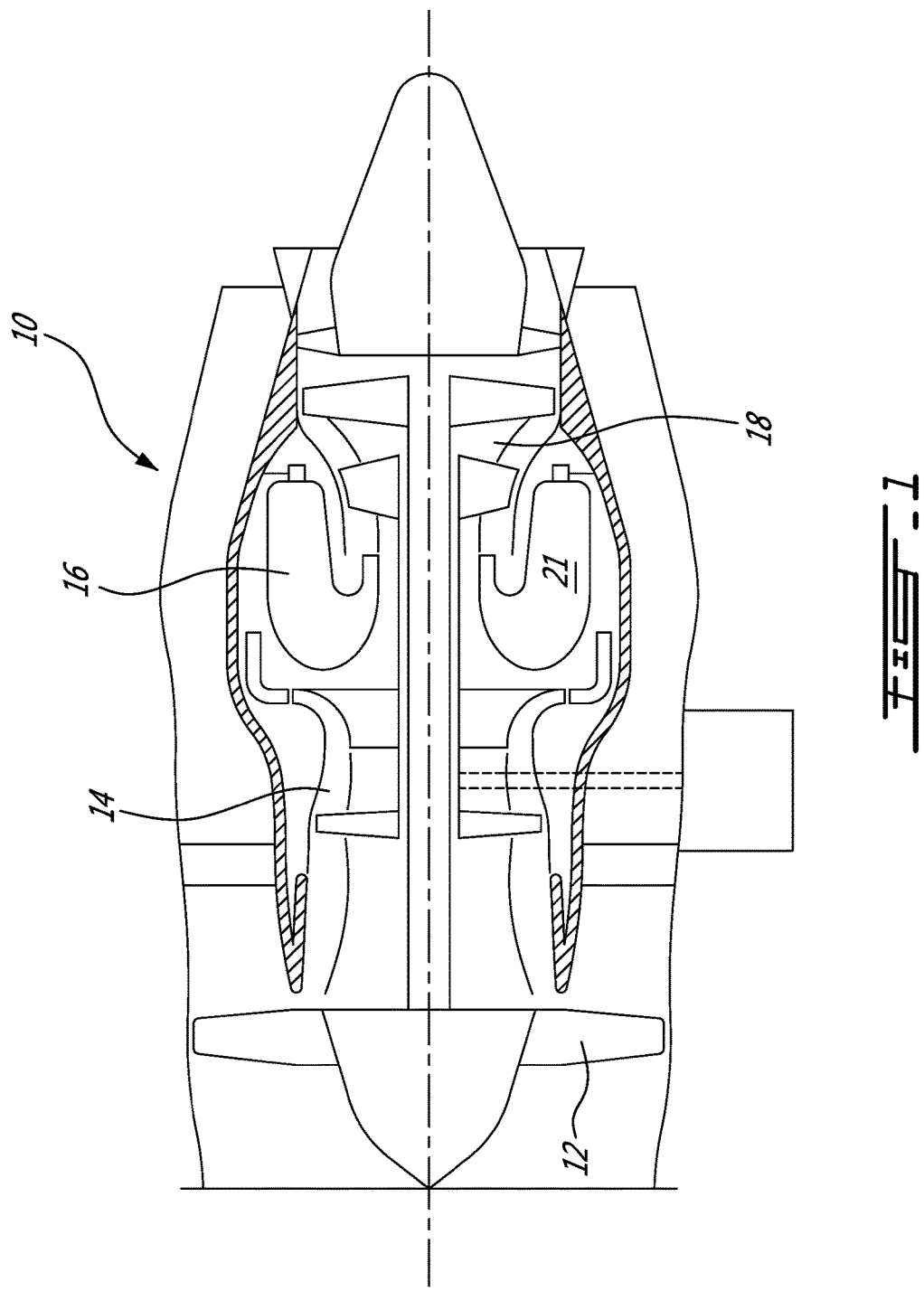
FIG. 1 is a schematic cross-section of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
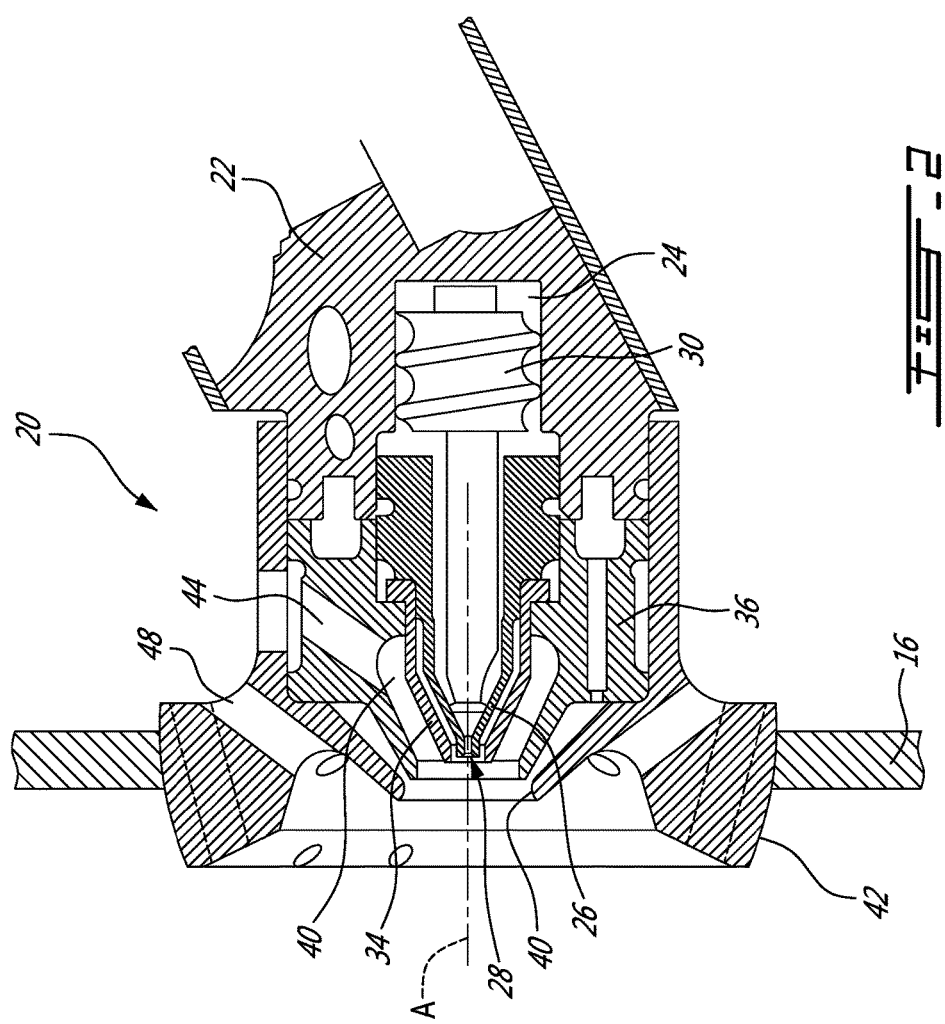
FIG. 2 is a fragmentary cross-section view of a pressure atomizing fuel nozzle.

Fuel is injected into the combustor of the engine 10 by a fuel injection system typically comprising a fuel manifold (not shown) feeding a set of circumferentially distributed fuel nozzles 20, an example of which is shown in FIG. 2. While fuel nozzle 20 is a pressure atomizing fuel nozzle, it is understood that air blast fuel nozzles could also be used to atomize the fuel as it is injected into the combustor 16 for ignition when mixed with the compressed air therein.

Still referring to FIG. 2, it can be appreciated that the fuel nozzle 20 comprises a body 22 defining a primary fuel chamber 24. A primary fuel spray tip 26, which may be provided in the form of a tubular insert, is disposed in the primary fuel chamber 24. The primary fuel spray tip 26 defines at a distal end portion thereof a single central fuel exit passage 28 extending about a spray axis A of the nozzle 20. The fuel exit passage 28 is coaxial to the primary fuel chamber 24. The detailed configuration of the fuel exit passage 28 of the primary fuel spray tip 26 will be described hereinafter with respect to FIG. 3. The fuel exit passage 28 communicates with the primary fuel chamber 24 for injecting the primary fuel into the combustor 16. A primary fuel swirling and metering device 30 may extend into the primary fuel spray tip 26 to cause the primary fuel to swirl within the primary fuel chamber 24. The main swirling and metering is done on the downstream end of device 30. Metering slots which also produce a swirl may be defined in the downstream end of the device 30. Swirl can be changed by changing the slot swirl angle, depth and width. The device 30 may be brazed to the primary fuel spray tip 26 and the body 22. The primary fuel nozzle 24 may, thus, be used as a swirling chamber to impart a swirl to the incoming flow of primary fuel before it be discharged through the fuel exit passage 28. As will be seen hereinafter, the swirl in combination with the geometry of the primary fuel exit passage 28 may have a synergic effect to widen the spray angle of the fuel nozzle 20.

A heat shield 34 may surround the distal or downstream end portion of spray tip 26, and in particular, for surrounding the fuel exit passage 28. As shown in FIG. 2, the heat shield 34 is configured to fit onto the spray tip 26.

A secondary fuel annular insert 36 may be mounted to the body 22 concentrically of the primary fuel spray tip 26 to form part of the secondary fuel distribution gallery and nozzle. The secondary fuel passes through somewhat spiral passages making up the fuel gallery. The secondary fuel is eventually delivered to an annular secondary fuel nozzle 40, which may also be a swirler to impart a swirl component to the secondary fuel. The secondary fuel sustains the combustion in the combustor after the primary fuel has been ignited.

The secondary fuel nozzle 40 may be formed by the insert 36 and a cylindrical tubular head 42 which fits onto the tip of body 22 and is concentric with the primary fuel spray tip 26 and the secondary fuel annular insert 36. The head 42 includes openings which define the core air passage which in turn communicates with core air swirler passages 44 in the insert 36. These core air passages 44 can communicate with core air channel 46 to pass pressurized air coming from the cooling air between the casing and the combustor wall, to enter into the combustor.

A second row of annular air passages 48 is also provided in the head 42 and communicates with the pressurized cooling air immediately outside of the combustor wall. The individual passages 48 are generally designed to provide a swirl to the mix of air and fuel, and, in fact, the purpose of the pressurized air coming through the passages 48 is to atomize the secondary fuel film exiting from the nozzle 40.

Figure 3:
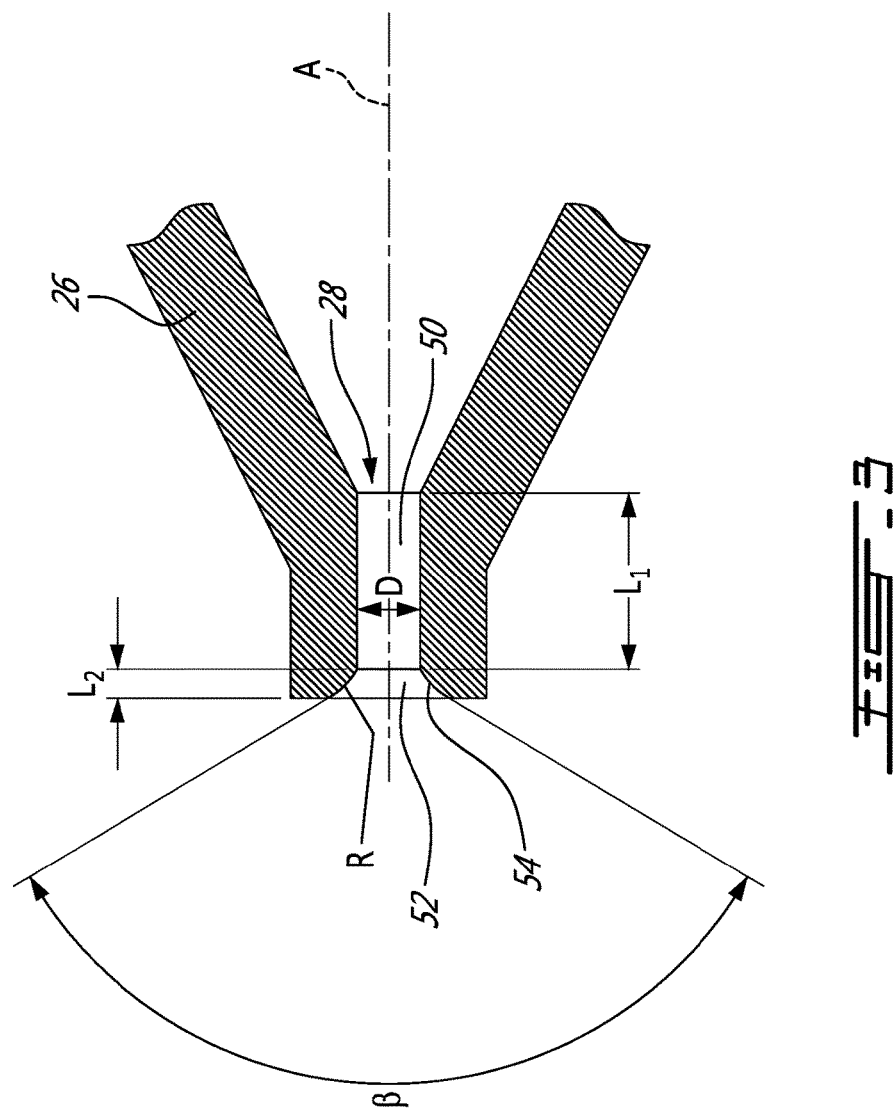
FIG. 3 is a fragmentary, enlarged cross-section view of a spherical fuel exit portion of the primary fuel spray tip of the fuel nozzle shown in FIG. 2.

Now turning to FIG. 3, it can be appreciated that the fuel exit passage 28 of the primary fuel spray tip 26 may comprise a cylindrical portion 50 having a diameter (D) and a length (L1) and an exit orifice, which may be provided in the form of a coaxial spherical distal end portion 52 extending axially downstream from the cylindrical portion 50 by a distance (L2). The length (L1) of the cylindrical portion 50 is selected to be long enough to stabilize the incoming swirl of fuel. However, the length (L1) should not be so long as to induce drag and result in flow momentum losses. For instance, the ratio L2/L1 may be selected to range from about 0.15 to about 0.5 for a diameter (D) ranging from about 0.010" to about 0.030".

The spherical distal end portion 52 of the primary fuel exit passage 28 is circumscribed by an inner annular surface or lip 54 curving away from the spray axis A in the downstream direction relative to the incoming swirling flow of primary fuel. The annular lip 54 is symmetric relative to the spray axis A. The annular lip 54 has a uniform curvature around the full circumference of the spherical distal end portion 52. The radius of curvature R of the annular lip 54 (the curvilinear flow guiding surface at the tip exit) is selected to achieve a desired spray angle β. According to an embodiment, the tip exit radius R can range from about 0.010" to about 0.030" For example, it was demonstrated that by only changing the tip exit radius R from 0.010" to 0.020", the spray angle β can be widen from 75 degrees to 105 degrees. Therefore, by replacing conventional straight/rectilinear fuel exit geometry with a specifically profiled curved geometry, a same basis fuel nozzle design can be re-used to achieve a much wider spray angle range and, thus, obtain a desired fuel mass distribution. This is surprising when taking into account the modest dimensions of such a gas turbine engine pressure atomizing fuel nozzle. It is noted that the swirl imparted to the fuel by the swirler 30 helps the fuel to stick or attach to the curvilinear surface of the lip 54 and, thus, contribute to increasing the spray angle β. A person skilled in the art would expect different results if a straight flow of fuel would to be used.

The annular lip 54 of the spherical distal end portion 52 of the primary fuel exit passage 28 may have a constant curvature along all the length (L2) thereof, that is from the downstream end of the cylindrical portion 50 to the very end of the fuel exit passage. As seen above, the length (L2) may be selected in relation to the length (L1) and the diameter (D) of the cylindrical portion 50 to take advantage of the natural tendency of a jet flow to attach itself to a nearby surface and to remain attached even when the surface curves away from the initial jet direction. The radius of curvature R of the annular lip 54, the length L2 of the curvilinear surface of the spherical distal end portion 52, the diameter D of the cylindrical portion 50 upstream of the spherical fuel exit portion 54, the length ratio (L1/L2), the ratio between the exit radii and the diameter D of the cylindrical portion 50 of the fuel exit passage 28 are all parameters that may be optimized relative to one another to take advantage of the so called Coanda effect as a means of widening the fuel spray angle β. According to one embodiment, the ratio between the exit radii and the diameter D of the cylindrical portion 50 ranges from about 0.5 to about 2.0.

Additional characteristics that may have an impact on the Coanda effect include: transition between the cylindrical portion 50 and spherical portion 54 of the fuel exit passage 28, fuel exit surface finish, fuel pressure and fuel properties. The transition must be smooth as much as possible. Steps should be avoided in order to avoid flow separation. The surface finish is selected to favor flow adhesion. For instance, the primary fuel exit passage 28, including the cylindrical portion 50 and the spherical portion 54 can be hand-polished or otherwise suitably treated to remove surface irregularities after having been machined. The roughness should be as low as possible. Also, as mentioned herein above, the fact that the primary fuel has a relatively high swirl before entering the "Coanda" area (i.e. the spherical distal end portion 52 of the fuel exit passage 28) affects the final spray characteristics. The fuel pressure may also affect the spray angle. According to a non-limiting embodiment, satisfactory results can be obtained by using a fuel pressure ranging: 300-1000 psi.

In operation, the tip geometry of the primary fuel spray tip 26 provides for wider spray angle in order to achieve desirable fuel mass distribution. High pressure primary fuel is supplied to the primary chamber 24 where the swirling and metering device 30 impart a high momentum swirl to the fuel. The swirling flow of fuel is stabilized while travelling along the cylindrical portion 50 of the primary fuel exit passage 28. Because of the Coanda effect, a portion (e.g. the boundary layers) of the swirling flow of primary fuel is caused to attach to the curvilinear surface of the annular lip 54 extending around the circumference of the spherical distal end portion 52 of the primary fuel exit passage 28, thereby providing for a wider spray cone.

In accordance with another embodiment, there is provided a gas turbine engine fuel nozzle having a spray tip defining a fuel exit passage therethrough that extends along a central axis. The fuel exit passage may be annular or not. An exit orifice is aligned with the axis. The exit orifice has an inner annular surface which expands in diameter in the downstream direction relative to the incoming fuel flow. The inner annular surface has a convex profile in cross-section such that a rate of change of radius increases along the inner annular surface in the downstream direction. The profile may be constant around the circumference of the inner annular surface.

The above description is meant to be exemplary only, and one skilled in the art will recognize that changes may be made to the embodiments described without departing from the scope of the invention disclosed. For example, while the present invention has been described in the context of a primary fuel spray tip, it is understood that the same principles could be apply to the secondary fuel spray tip. As shown in FIG. 2, the outer lip of the secondary fuel nozzle 40 could be curved as opposed to being straight. Still other modifications which fall within the scope of the present invention will be apparent to those skilled in the art, in light of a review of this disclosure, and such modifications are intended to fall within the appended claims.

The invention claimed is:

1. A gas turbine engine fuel nozzle comprising: a spray tip defining a fuel exit passage therethrough that extends along a central axis, the fuel exit passage having an exit orifice aligned with the central axis, the exit orifice being circumscribed by an inner annular surface, the inner annular surface expanding in diameter in a downstream direction relative to a fuel flow direction through the fuel nozzle, the inner annular surface having a spherically-convex profile at a cross-section thereof, the cross-section taken on a plane containing the central axis, the inner annular surface having a length (L2) extending axially from a first point where a diameter of the fuel exit passage starts to increase to a second axially spaced-apart point corresponding to a downstream edge of the inner annular surface where fuel exits the exit orifice, a radius of curvature (R) of the inner annular surface at the cross-section being constant along the full extent of the length (L2), the spherically-convex profile being constant around the circumference of the inner annular surface, the fuel exit passage having a cylindrical portion ending at the first point, the inner annular surface projecting axially from the cylindrical portion, the cylindrical portion and the exit orifice being coaxial, wherein the cylindrical portion has a length (L1) ending where the diameter of the fuel exit passage starts to increase, and wherein a ratio L2/L1 is comprised between about 0.15 to about 0.5.

2. The gas turbine engine fuel nozzle defined in claim 1, wherein the inner annular surface is symmetric relative to the central axis.

3. The gas turbine engine fuel nozzle defined in claim 1, wherein the radius of curvature (R) ranges from about 0.010" to about 0.030".

4. The gas turbine engine fuel nozzle defined in claim 1, further comprising a primary fuel chamber upstream of the fuel exit passage, and a swirler for imparting a swirl to the incoming flow of fuel, the primary fuel chamber being in fluid flow communication with the fuel exit passage.

5. The gas turbine engine fuel nozzle defined in claim 1, wherein the fuel nozzle is a pressure atomizing fuel nozzle or an air blast fuel nozzle, and wherein the spray tip is a primary fuel nozzle tip.

6. The gas turbine engine fuel nozzle defined in claim 5, further comprising a secondary fuel nozzle, the secondary fuel nozzle including an outer lip which curves away from the central axis in a downstream direction relative to an incoming flow of a secondary fuel.

7. The gas turbine engine fuel nozzle defined in claim 1, wherein the cylindrical portion and the exit orifice are polished to provide for a smooth flow guiding surface along the fuel exit passage.

8. A gas turbine engine fuel nozzle comprising: a spray tip defining a fuel exit passage therethrough that extends along a central axis, the fuel exit passage having an exit orifice aligned with the central axis, the exit orifice being circumscribed by an inner annular surface, the inner annular surface expanding in diameter in a downstream direction relative to a fuel flow direction through the fuel nozzle, the inner annular surface having a spherically-convex profile at a cross-section thereof, the cross-section taken on a plane containing the central axis, the inner annular surface having a length (L2) extending axially from a first point where a diameter of the fuel exit passage starts to increase to a second axially spaced-apart point corresponding to a downstream edge of the inner annular surface where fuel exits the exit orifice, the spherically-convex profile being constant around the circumference of the inner annular surface, wherein the fuel exit passage has a cylindrical portion upstream of the exit orifice, the cylindrical portion and the exit orifice being coaxial, the inner annular surface projecting axially from the cylindrical portion and wherein the cylindrical portion has a length (L1) ending where the diameter of the fuel exit passage starts to increase, and wherein a ratio L2/L1 is comprised between about 0.15 to about 0.5.

* * * * *